United States Patent
Creamer et al.

(10) Patent No.: US 6,690,782 B2
(45) Date of Patent: Feb. 10, 2004

(54) SERVICE LOGIC EXECUTION ENVIRONMENT CONNECTOR TO CLIENT INTERFACE

(75) Inventors: Thomas E. Creamer, Boca Raton, FL (US); Samuel Kallner, Yaakov (IL); Victor S. Moore, Boynton Beach, FL (US); Gal Shachor, Yokneam (IL); Pnina Vortman, Haifa (IL); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 09/884,576

(22) Filed: Jun. 18, 2001

(65) Prior Publication Data

US 2002/0194397 A1 Dec. 19, 2002

(51) Int. Cl.[7] .......................... H04M 3/42; H04M 7/00; G06F 9/46
(52) U.S. Cl. ............. 379/201.12; 370/469; 379/221.08; 709/250; 709/328
(58) Field of Search ................................. 370/259, 469; 379/201.01, 201.02, 201.03, 201.05, 201.12, 221.08, 221.09, 221.15; 709/202, 203, 223, 224, 226, 229, 250, 318, 328

(56) References Cited

U.S. PATENT DOCUMENTS

| | | | |
|---|---|---|---|
| 5,864,668 A | 1/1999 | Andert et al. | 709/203 |
| 6,016,499 A | 1/2000 | Ferguson | 707/104.1 |
| 6,081,533 A | 6/2000 | Laubach et al. | 370/421 |
| 6,115,719 A | 9/2000 | Purdy et al. | 707/100 X |
| 6,363,411 B1 * | 3/2002 | Dugan et al. | 709/202 |
| 6,393,481 B1 * | 5/2002 | Deo et al. | 709/224 |
| 6,425,005 B1 * | 7/2002 | Dugan et al. | 709/223 |

OTHER PUBLICATIONS

W. Seigneur, *The Open Architecture Distributed Switching Model, Building the Network Operating System for the Information Superhighway*, SONeTech, Inc. <http://www.sonetech.com/conferences/nfoec94.html>.

Keijzer, et al., *JAIN: A New Approach to Services in Communication Networks*, pp. 94–99, IEEE Communications Magazine, (Jan. 2000).

Jain, et al., *Java Call Control, Coordination, and Transactions*, pp. 108–114, IEEE Communications Magazine, (Jan. 2000).

Beddus, et al., *Opening Up Networks with JAIN Parlay*, pp. 136–143, IEEE Communications Magazine, (Apr. 2000).

Bhat, et al., *JAIN Protocol APIs*, pp. 100–107, IEEE Communications Magazine, (Jan. 2000).

S. Silberstang, *Service Creation for Advanced Intelligent Networks Utilizing Intelligent Peripherals*, (Mar. 2001) <http://www.amarex.com/service.html>.

Keijzer, et al., *The Telephony Interoperability Challenge*, Sun Journal, (Mar. 2001) <http://www.sun.com/dot-com/sunjournal/v3n2/Telephony.html>.

JAIN™: *Integrated Network APIs for the JAVA™ Platform*, (Sep. 2000) <http://www.java.sun.com/products/jain/>.

JAIN™ SCE/SLEE API Specification, (Mar. 2001) <http://www.javasoft.com/aboutJava/communityprocess/jsr/jsr_022_jsce.html>.

* cited by examiner

*Primary Examiner*—Harry S. Hong
(74) *Attorney, Agent, or Firm*—Akerman Senterfitt

(57) ABSTRACT

An application execution environment for an intelligent network which has been configured in accordance with the inventive arrangements can include a service logic execution environment (SLEE); at least one client component wrapper, the at least one client component wrapper providing an abstracted interface for a specific client component; and, at least one connector associated with the SLEE, the at least one connector corresponding to at least one client component wrapper, wherein the connector is configured to communicate with a client component through an abstracted interface provided by the corresponding at least one client component wrapper. Notably, the SLEE can be a JAIN-compliant SLEE.

14 Claims, 3 Drawing Sheets

SERVICE LOGIC EXECUTION ENVIRONMENT CONNECTOR TO CLIENT INTERFACE

BACKGROUND OF THE INVENTION

1. Technical Field

This invention relates to the field of advanced intelligent networks and more particularly to service logic execution environments.

2. Description of the Related Art

The development of the open network application programming interface (API) represents an important departure from traditional methods for opening the architecture of the public switched telephone network (PSTN). One such open network API, the Advanced Intelligent Network (AIN) API and architecture, defines a call model which allows the creation of telecommunications service applications outside of the switch environment. Telecommunications service applications are a' la carte telecommunications applications which can perform enhanced services for a telecommunications session established among two or more parties. Exemplary services applications can include Call Waiting, Caller ID, Call Forwarding, Voice Activated Dialing, and Meet-me Conferencing.

When AIN first had been introduced, in terms of the service application creation process, the AIN architecture represented an important advance. AIN separated service development from switching, allowing service logic components to be developed more quickly and placed in specialized network elements attached to databases. Switches, in turn, being free from all service logic, could be optimized for speed and efficiency. Still, typical service applications developed to the AIN specification are written in specialized languages by specially trained programmers using specialized service creation environments.

Importantly, future telecommunications networks will be characterized by new and evolving network architectures where packet-switched, circuit-switched, and wireless networks are integrated to offer subscribers an array of innovative multimedia, multiparty applications. Equally important, it is expected that the process by which telecommunications applications are developed will change, and will no longer solely be the domain of the telecommunications network or service application provider. In fact, in order to provide a broad portfolio of novel, compelling applications rapidly, service application providers will increasingly turn to third-party applications developers and software vendors. Thus, application development in the telecommunications domain will become more similar to that in software and information technology in general, with customers reaping the benefits of increased competition, reduced time to market, and the rapid leveraging of new technology as it is developed.

To make this vision a reality, the principles of AIN have been discarded in favor of a new service application component development paradigm. Specifically, it has been recognized that future integrated networks must offer application developers a set of standard, open APIs so that applications written for compatibility with one vendor's system can execute in the system of another vendor. In consequence, the cost of applications development can be amortized, reducing the final cost to the customer. Java APIs for Integrated Networks (JAIN) fulfills the requirements of the new service application component development paradigm. Presently, JAIN includes standard, open, published Java APIs for next-generation systems consisting of integrated Internet Protocol (IP) or asynchronous transport mode (ATM) networks, PSTN, and wireless networks. The JAIN APIs include interfaces at the protocol level, for different protocols such as Media Gateway Control Protocol (MGCP), Session Initiation Protocol (SIP), and Transactional Capabilities Application Part (TCAP), as well as protocols residing in the higher layers of the telecommunications protocol stack.

JAIN includes a set of integrated network APIs for the Java platform and an environment to build and integrate JAIN components into services or applications that work across PSTN, packet and wireless networks. The JAIN approach integrates wireline, wireless, and packet-based networks by separating service-based logic from network-based logic. FIG. 1 illustrates a conventional JAIN implementation. As shown in FIG. 1, a conventional JAIN implementation can include a protocol layer 102 which can include interfaces to IP, wireline and wireless signaling protocols. Though only TCAP, JCC and H.323 protocols 110 are shown, the protocols supported by the JAIN specification are not limited to particular protocols and can include, for example, TCAP, ISUP, INAP, MAP, SIP, MGCP, and H.323. Moreover, the JAIN implementation can include an interface to a connectivity management and call control protocol such as JCC. The conventional JAIN implementation also can include an application layer 104 for handling secure network access and other external services. Finally, the conventional JAIN implementation can include a service layer 106 which can include a service creation and carrier grade service logic execution environment (SLEE) 108.

Service components 112 are the core JAIN components and can execute in the SLEE 108. More particularly, service components 112 can implement telephony and network services and can be constructed according to a standard component model. Instantiations of service component assemblies execute in coordination with the SLEE 108. In operation, using information regarding the protocol layer 102 which can be incorporated into the SLEE 108, service components 112 can interact with an underlying protocol stack 110 without having specific knowledge of the protocol stack 110. More importantly, the SLEE 108 can relieve the service components 112 of conventional lifecycle responsibilities by providing portable support for transactions, persistence, load balancing, security, and object and connection instance pooling. In this way, the service components 112 can focus on providing telephony and/or network services.

Notably, the SLEE 110 can be communicatively linked directly to client components such as external applications 116, protocol stacks 110 and service components 112. For example, service components 112 executing at the service layer 106 in the SLEE 108 can communicate with protocol stacks 110 in the protocol layer through protocol adapters in the SLEE 108. Protocol adapters typically can include class methods, callbacks, encapsulating interfaces, or event handlers. In many cases, an underlying protocol stack 110 can directly communicate with the SLEE 108 through an event table 114 in the SLEE 108 which can be configured to specifically handle events which are particular to the underlying protocol stack 110. In consequence, the SLEE 108 can recognize those particular events, and upon receipt of such an event from the underlying protocol stack 110, the SLEE 108 can pass the event to a subscribing service component 112.

Despite the apparent advantages of the JAIN specification, however, conventional implementations of the JAIN specification include some drawbacks. In particular, in order to relieve service components of the complexities of communicating with client components, the SLEE requires specific knowledge of the client components. For instance, to communicate with the protocol stacks in the protocol layer, the SLEE requires specific knowledge of the underlying protocol stacks as will be apparent from corresponding event tables which can be used to facilitate communications between the SLEE and an underlying protocol stack.

Including specific client component information in the SLEE, however, can add unnecessary complexity to the SLEE. From a life-cycle maintenance perspective this can be problematic. Also, including client component information in the SLEE unnecessarily directly binds the SLEE to particular client components. Finally, directly binding the SLEE to particular client components can require the positioning of the application layer, protocol layer and the service layer in close computing proximity to one another. Hence, what is needed is a more flexible system and method for communicatively linking a SLEE to client components.

SUMMARY OF THE INVENTION

The present invention is an application execution environment for an intelligent network in which a service logic execution environment (SLEE) in the application execution environment can be configured to communicate with client components without having specific knowledge of the implementation of each client component. The present invention solves the deficiencies of the prior art by removing specific client component information from the SLEE and substituting therefor a connector/wrapper communications interface. The SLEE can generically transmit and receive communications through the connector/wrapper interface regardless of the implementation details of the underlying client components. Rather, only the wrapper requires specific knowledge of the implementation details of the underlying client components. Hence, in accordance with the inventive arrangements, the complexity of the SLEE can be reduced. Moreover, a SLEE configured in accordance with the inventive arrangements need not be directly bound to particular client components.

An application execution environment for an intelligent network which has been configured in accordance with the inventive arrangements can include a SLEE; at least one client component wrapper, the at least one client component wrapper providing an abstracted interface for a specific client component; and, at least one connector associated with the SLEE, the at least one connector corresponding to at least one client component wrapper, wherein the connector is configured to communicate with a client component through an abstracted interface provided by the corresponding at least one client component wrapper. Notably, the SLEE can be a JAIN-compliant SLEE.

In one aspect of the present invention, the application execution environment can further include a SLEE descriptor, the SLEE descriptor specifying at least one client component wrapper with which a connector associated with the SLEE can be configured to communicate. Additionally, the application execution environment can include at least one client component descriptor, each client component descriptor corresponding to a specific client component having a corresponding client component wrapper with which a connector in the SLEE has been configured to communicate, the at least one client component descriptor specifying particular events for which the specific client component can be notified by the SLEE. The specific client component can be selected from the group consisting of a protocol stack, an external application component, and a service component executing in the SLEE. Also, the specific client component can be selected from the group consisting of a call-control component, a signaling protocol component, a connectivity management protocol, and a secure network access protocol.

A method of communicatively linking a SLEE to a client component in an application execution environment of an integrated network can include the steps of configuring a connector in the SLEE to communicate with a client component wrapper having an associated client component, the client component wrapper providing an interface to the associated client component; receiving events in the configured connector from the associated client component, wherein the events are directed to an event handler in the SLEE; and, transmitting events from the event handler in the SLEE through configured connector to the client component through the client component wrapper. In consequence, the SLEE can be communicatively linked to the client component through the client component wrapper without requiring the SLEE to have specific knowledge of the client component.

Importantly, the step of configuring the connector in the SLEE can include the steps of identifying in a SLEE descriptor a particular client component; loading the particular client component identified in the SLEE descriptor; and, configuring the connector to communicate with a client component wrapper associated with the particular client component. Additionally, the method can include identifying in a subscription descriptor configuration parameters for configuring the connector to communicate with the client component wrapper associated with the particular client component; and, configuring the connector in accordance with the identified parameters in the subscription descriptor. Finally, the step of configuring the connector in accordance with the identified parameters in the subscription descriptor can include registering the connector to receive particular events received in the event handler in the SLEE, wherein the particular events are specified in the subscription descriptor.

The present invention can be embodied in a machine readable storage having stored thereon a computer program for communicatively linking a SLEE to a client component in an application execution environment of an integrated network. More particularly, the computer program can have a plurality of code sections executable by a machine for causing the machine to perform the steps of configuring a connector in the SLEE to communicate with a client component wrapper having an associated client component, the client component wrapper providing an interface to the associated client component; receiving events in the configured connector from the associated client component, wherein the events are directed to an event handler in the SLEE; and, transmitting events from the event handler in the SLEE through configured connector to the client component through the client component wrapper. As a result, the SLEE can be communicatively linked to the client component through the client component wrapper without requiring the SLEE to have specific knowledge of the client component.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a service logic execution environment (SLEE) connector to client component interface which can solve the deficiencies of the prior art by providing a configurable connection through a generic interface to a specific client component without inflexibly binding the client component to the SLEE. Unlike conventional implementations of a SLEE in which the SLEE is directly bound to those client components with which the SLEE communicates, in the present invention, the SLEE and client component need not be positioned proximately to one another. Rather, the SLEE and client component can be positioned across a network, if need be. In this way, a more flexible association between client component and SLEE is possible which can facilitate the maintenance and enhancement of the SLEE during lifecycle maintenance. Moreover, the specific knowledge of a particular client component can be removed from the SLEE and can be included, instead, in the interface to the client component. As a result, the complexity of the SLEE can be reduced.

Figure 1:
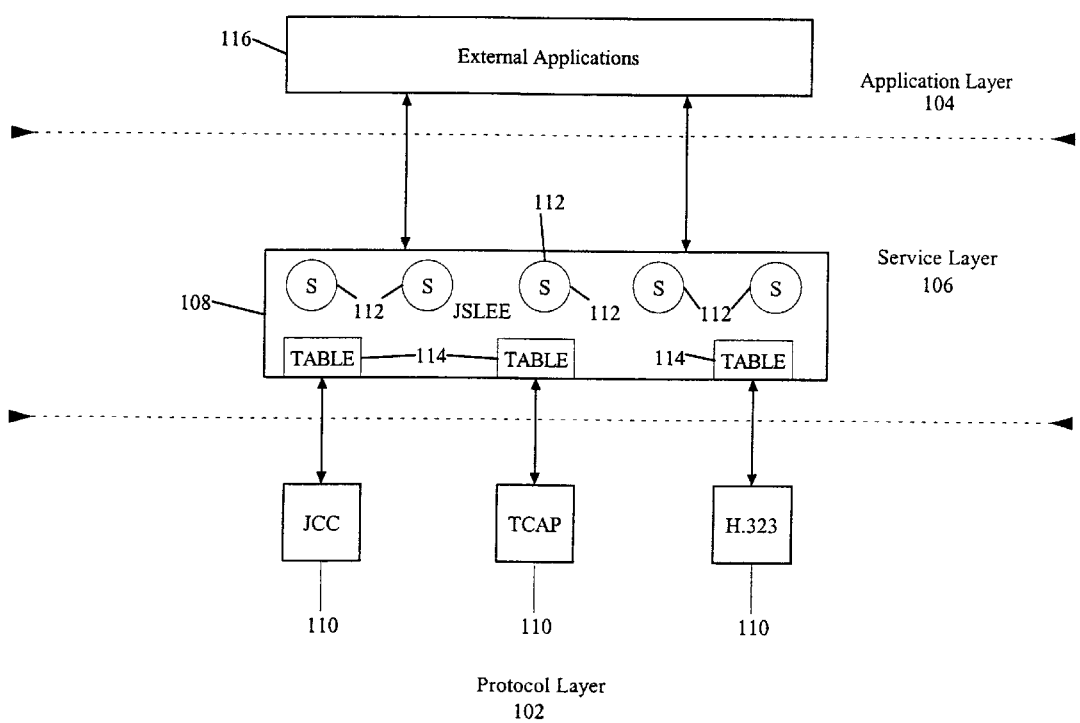
FIG. 1 is a schematic representation of an intelligent network architecture configured in accordance with a conventional JAIN implementation known in the prior art.
Figure 2:
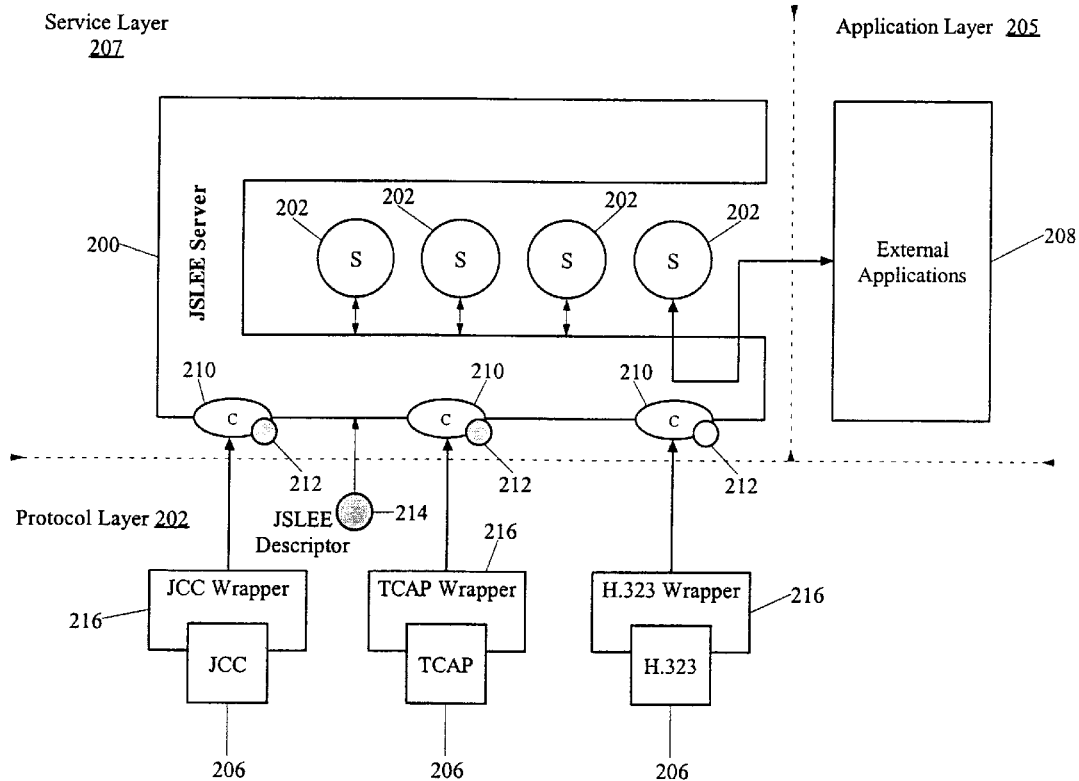
FIG. 2 is a schematic representation of an intelligent network architecture including a service logic execution environment (SLEE) configured in accordance with the inventive arrangements.

FIG. 2 is a schematic illustration of a JAIN-compliant intelligent network configured in accordance with the inventive arrangements. A JAIN-compliant network configured in accordance with the inventive arrangements can include a protocol layer 202, an application layer 205 and a service layer 207. The application layer 205 can host external third party applications 208. Typical third party applications 208 can suit mass-market demand for services such as virtual private networks (VPNs), inbound services and unified messaging. External third party applications 208 also can include short-lived and niche applications which can be deployed using un-trusted application space deployment technologies such as database lookup interfaces, downloadable mechanisms, and the Parlay API, as are well known in the art.

The service layer 207 can include a SLEE server such as a JSLEE Server 200 which can be configured for compatibility with the JAIN specification. The protocol layer 202 can include one or more protocol stacks 206 which can be configured to interact with service components 202 executing in the JSLEE Server 200. Notably, although FIG. 2 only depicts three protocol stacks 206, the invention is not limited in regard to the number or type of protocol stacks 206. Rather, JSLEE Server 200 can interact with any protocol stack, for example those protocol stacks configured in accordance with the JAIN specification.

In operation, the JSLEE Server 200 can transmit and receive events to and from the protocol stacks 206 in the protocol layer 202. More particularly, the events can be transmitted and received in an event handler included in the JSLEE Server 200. Likewise, service components 202 which are registered with the JSLEE Server can receive protocol stack events directed towards particular ones of the service components 202. More specifically, the event handler of the JSLEE Server 200 can route received events to service components 202 which have registered with the JSLEE Server 200 to receive such events.

Notably, in accordance with the inventive arrangements, the JSLEE Server 200 can be configured to communicate with client components in the JAIN-compliant intelligent network. Client components can include not only the protocol stacks 206, but also other service components 202 and external applications 208. Importantly, the JSLEE Server 200 can be so configured without having specific knowledge of the implementation of each client component. To accomplish this feat, the JSLEE Server 200 can include connectors 210 which can communicate with wrappers 216 thereby forming a connector/wrapper interface. The wrapper 216 can provide to the connector 210 an abstracted interface for a specific client component such as the protocol stack 206. Each connector 210, in turn, can be configured to communicate with a corresponding client component such as a protocol stack 206 through the abstracted interface provided by the corresponding wrapper 216. Thus, in general, the JSLEE Server 200 can generically transmit and receive events through the connector/wrapper interface regardless of the implementation details of the underlying client components such as protocol stacks 206. Rather, only the wrapper 216 requires specific knowledge of the implementation details of the underlying protocol stack 206.

In one aspect of the present invention, a JSLEE descriptor 214 can be included. The JSLEE descriptor 214 can specify individual wrappers 216 with which corresponding connectors 210 can be configured to communicate. In particular, the JSLEE Server 200, at start-up, can read the JSLEE descriptor 214 to learn the identity of each specified wrapper 216. Subsequently, the JSLEE Server 200 can configure connectors 210 to communicate with the specified wrappers 216. Similarly, client component descriptors 212 can be provided for each connector 210. The client component descriptors 212 can specify particular events for which an associated client component such as a protocol stack 206 can be notified by the JSLEE Server 200.

Figure 3:
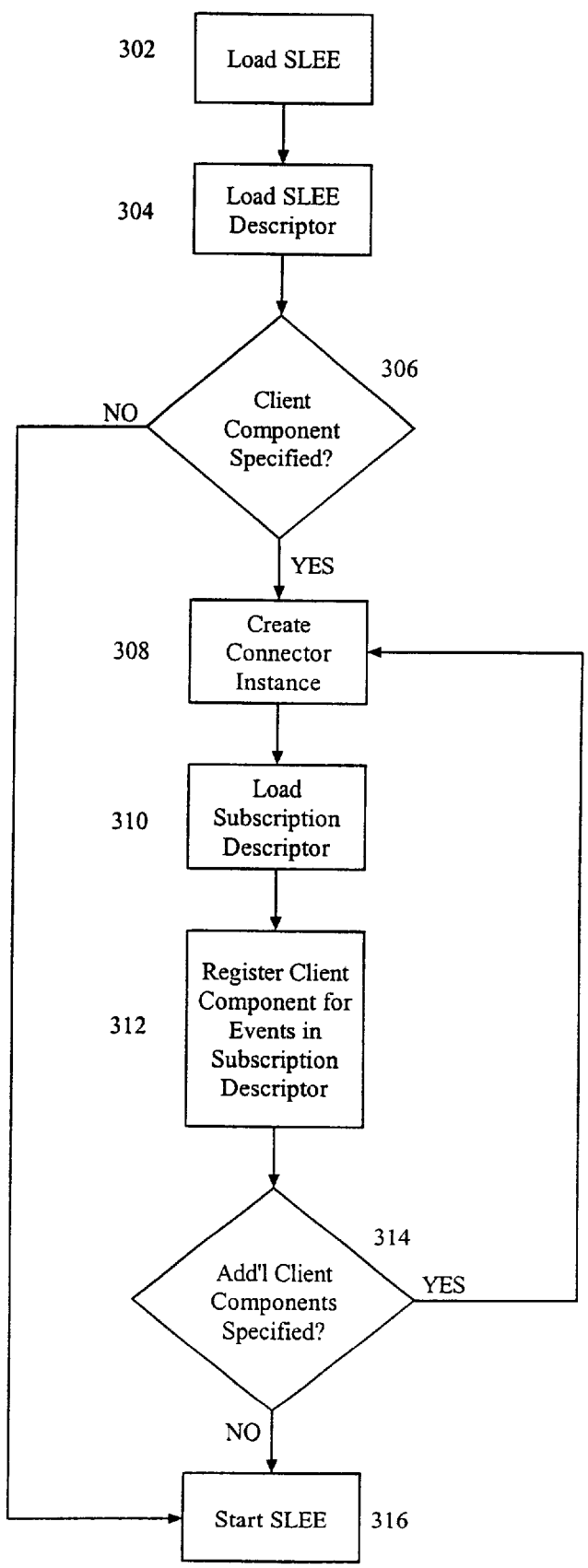
FIG. 3 is a flow chart which illustrates a method of communicatively linking a SLEE to a client component in an application execution environment of an integrated network.

FIG. 3 is a flow chart which illustrates a method of communicatively linking a SLEE to a client component in an application execution environment of an integrated network. The method can begin in block 302 in which the SLEE can be loaded. In block 304, a SLEE descriptor can be loaded. If, in decision block 306 a client component is specified, in block 308 a connector instance can be created and configured to communicate with a wrapper associated with the specified client component. In block 310, a subscription descriptor associated with the configured connector can be loaded and in block 312, the specified client component can be registered with an event handler in the SLEE to receive those events listed in the subscription descriptor.

Subsequently, in decision block 314, if additional client components are listed in the SLEE descriptor, additional connector instances can be created and configured in accordance with blocks 308 through 312. Finally, once all connector instances have been created and configured, the SLEE can be started in step 316 and events can be routed to registered client components through the connector/wrapper interface regardless of the underlying implementation of each individual client component. In consequence, the SLEE can be communicatively linked to client components through client component wrappers without requiring the SLEE to have specific knowledge of each client component.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. An application execution environment for an intelligent network comprising:
    a service logic execution environment (SLEE);
    at least one client component wrapper, said at least one client component wrapper providing an abstracted interface for a specific client component; and,
    at least one connector associated with said SLEE, said at least one connector corresponding to at least one client component wrapper, wherein said connector is configured to communicate with a client component through an abstracted interface provided by said corresponding at least one client component wrapper.

2. The application execution environment of claim 1, further comprising:
    a SLEE descriptor, said SLEE descriptor specifying at least one client component wrapper with which a connector associated with said SLEE can be configured to communicate.

3. The application execution environment of claim 1, further comprising:
    at least one client component descriptor, each client component descriptor corresponding to a specific client component having a corresponding client component wrapper with which a connector in said SLEE has been configured to communicate, said at least one client component descriptor specifying particular events for which said specific client component can be notified by said SLEE.

4. The application execution environment of claim 1, wherein said specific client component is selected from the group consisting of a protocol stack, an external application component, and a service component executing in said SLEE.

5. The application execution environment of claim 1, wherein said SLEE is a JAIN-compliant SLEE.

6. The application execution environment of claim 1, wherein said specific client component is selected from the group consisting of a call-control component, a signaling protocol component, a connectivity management protocol, and a secure network access protocol.

7. A method of communicatively linking a service logic execution environment (SLEE) to a client component in an application execution environment of an integrated network comprising the steps of:
    configuring a connector in the SLEE to communicate with a client component wrapper having an associated client component, said client component wrapper providing an interface to said associated client component;
    receiving events in said configured connector from said associated client component, wherein said events are directed to an event handler in the SLEE; and,
    transmitting events from said event handler in the SLEE through configured connector to said client component through said client component wrapper,
    whereby the SLEE can be communicatively linked to said client component through said client component wrapper without requiring the SLEE to have specific knowledge of said client component.

8. The method of claim 7, wherein said step of configuring said connector in the SLEE comprises the steps of:
    identifying in a SLEE descriptor a particular client component;
    loading said particular client component identified in said SLEE descriptor; and,
    configuring said connector to communicate with a client component wrapper associated with said particular client component.

9. The method of claim 8, further comprising the steps of:
    identifying in a subscription descriptor configuration parameters for configuring said connector to communicate with said client component wrapper associated with said particular client component; and,
    configuring said connector in accordance with said identified parameters in said subscription descriptor.

10. The method of claim 9, wherein said step of configuring said connector in accordance with said identified parameters in said subscription descriptor comprises the step of:
    registering said connector to receive particular events received in said event handler in the SLEE, wherein said particular events are specified in said subscription descriptor.

11. A machine readable storage, having stored thereon a computer program for communicatively linking a service logic execution environment (SLEE) to a client component in an application execution environment of an integrated network, said computer program having a plurality of code sections executable by a machine for causing the machine to perform the steps of:
    configuring a connector in the SLEE to communicate with a client component wrapper having an associated client component, said client component wrapper providing an interface to said associated client component;
    receiving events in said configured connector from said associated client component, wherein said events are directed to an event handler in the SLEE; and,
    transmitting events from said event handler in the SLEE through configured connector to said client component through said client component wrapper,
    whereby the SLEE can be communicatively linked to said client component through said client component wrapper without requiring the SLEE to have specific knowledge of said client component.

12. The machine readable storage of claim 11, wherein said step of configuring said connector in the SLEE comprises the steps of:
- identifying in a SLEE descriptor a particular client component;
- loading said particular client component identified in said SLEE descriptor; and,
- configuring said connector to communicate with a client component wrapper associated with said particular client component.

13. The machine readable storage of claim 12, further comprising the steps of:
- identifying in a subscription descriptor configuration parameters for configuring said connector to communicate with said client component wrapper associated with said particular client component; and,
- configuring said connector in accordance with said identified parameters in said subscription descriptor.

14. The machine readable storage of claim 13, wherein said step of configuring said connector in accordance with said identified parameters in said subscription descriptor comprises the step of:
- registering said connector to receive particular events received in said event handler in the SLEE, wherein said particular events are specified in said subscription descriptor.

* * * * *